United States Patent [19]
Mariaggi et al.

[11] Patent Number: 5,971,071
[45] Date of Patent: Oct. 26, 1999

[54] METHOD OF USING THERMOSETTING COMPOSITIONS WITH IMPROVED LATENCY

[75] Inventors: Paul Mariaggi, Seyssuel; Frederique Jacquemin-Hauviller, Saint Genis Laval; Henri Delhomme, Sainte Foy les Lyons; Dominique Augigier, Brignais, all of France

[73] Assignee: Institut Francais du Petrole, Cedex, France

[21] Appl. No.: 09/116,252

[22] Filed: Jul. 16, 1998

Related U.S. Application Data

[62] Division of application No. 08/848,488, May 8, 1997, Pat. No. 5,817,737.

[30] Foreign Application Priority Data

May 9, 1996 [FR] France .................................. 96 05885

[51] Int. Cl.⁶ ...................................................... E21B 33/14
[52] U.S. Cl. ........................................... 166/295; 528/124
[58] Field of Search ..................................... 166/292, 293, 166/294, 295, 270, 272, 300; 528/124; 428/34.7, 35.7, 36.92

[56] References Cited

U.S. PATENT DOCUMENTS

| | | |
|---|---|---|
| 3,427,282 | 2/1969 | Sundholm . |
| 3,481,900 | 12/1969 | Sundholm . |
| 4,003,876 | 1/1977 | Warfield et al. . |
| 5,151,471 | 9/1992 | Qureshi et al. . |

FOREIGN PATENT DOCUMENTS

| | | |
|---|---|---|
| 0 018 950 | 11/1980 | European Pat. Off. . |
| 0 170 075 | 2/1986 | European Pat. Off. . |
| 1 668 986 | 9/1971 | Germany . |
| 94/25655 | 11/1994 | WIPO . |

*Primary Examiner*—William Neuder
*Attorney, Agent, or Firm*—Millen, White, Zelano & Branigan

[57] ABSTRACT

Thermosetting compositions with improved latency are obtained by addition of a molten aromatic polyamine type curing agent to a liquid epoxy resin followed by cooling the mixture, causing the curing agent to form a suspension of fine particles in the epoxy resin by recrystallisation thereof. The compositions obtained can be used for the manufacture of prepregs with high latency for their use in processes requiring intermediate steps at 80° C. over several hours.

15 Claims, No Drawings

METHOD OF USING THERMOSETTING COMPOSITIONS WITH IMPROVED LATENCY

This is a division of application Ser. No. 08/848,488 filed May 8, 1997 now U.S. Pat. No. 5,817,737.

The present invention concerns thermosetting compositions with improved latency, obtained from a suspension of fine particles of at least one aromatic polyamine containing at least one substituent on the aromatic ring alpha to each of the amine functions. These polyamines are the principal cross-linking (curing) agents for epoxy resins.

The aromatic polyamines which are intended for use in the present invention are preferably primary aromatic diamines which preferably contain two substituents on the aromatic ring alpha to each of the amine functions. These substituents are usually hydrocarbon groups or residues, preferably saturated, for example alkyl groups or residues containing 1 to 12 carbon atoms, usually 1 to 4 carbon atoms. Examples of such substituents are methyl, ethyl, propyl (n-propyl or isopropyl) groups, and linear or branched butyl groups. These amines are preferably selected from the alkylidene-diarylamine group, in particular the alkylidene-diphenyl-4,4'-diamine group. The alkoylidene group of these diamines is preferably a methylidene or ethylidene group.

Examples of preferred aromatic polyamines for use in the present invention are 4,4'-methlylene-bis-(2,6-diethylaniline), abbreviated here to M-DEA, and 4,4'-methylene-bis-(2,6-dimethylaniline), abbreviated here to M-DMA.

BACKGROUND OF THE INVENTION

Processes exist in the industry which use those aromatic polyamines, in particular M-DEA and M-DMA, as curing agents for certain epoxy resins such as the various types of ARALDITE®, EPIKOTE® resins, EPON® resins, the resin obtained from the diglycidylether of bis-phenol-F, abbreviated here to DGEBF, and in particular the resin obtained from the diglycidylether of bis-phenol-A, abbreviated to DGEBA. In such processes, prior dissolution of the M-DEA or M-DMA in the DGEBA resin before impregnation into the reinforcing fibre, for example glass fibre, carbon fibre, ceramic fibre or a natural or synthetic fibre, is expressly recommended. The polyamine is normally dissolved in the epoxy resin to form a homogeneous solution using two principal methods, which are summarised below.

In a first method, the aromatic polyamine is dissolved in the epoxy resin which has been preheated to a temperature which is higher than the melting point of the polyamine used, or higher than the melting point of the polyamine with the highest melting point when a mixture of polyamines is used. Dissolution generally takes at least 15 minutes, very often 15 to 30 minutes. During that phase, the temperature must be kept at least at the melting point of the polyamine with the highest melting point in order to obtain a homogeneous solution. If necessary, the dissolution period is increased until a homogeneous solution is obtained. Despite rapid cooling, the fact that the polyamine is dissolved when hot, i.e., at a temperature which is at least equal to its melting point, causes the reaction (polyaddition) to begin, thus requiring the user to store the resin or prepreg at low temperatures, i.e., at a temperature which is sufficiently low for the polyaddition reaction to be severely limited and to thus obtain at a usable life of several tens of days, or several months. Without cold storage, i.e., at a minimum of minus 18° C., the usable life of the homogeneous mixture obtained would only be a few hours, which is completely unsatisfactory for the envisaged use of such compositions.

The second recommended method consists of dissolving the polyamine or mixture of polyamines at low temperature in a suitable solvent with a relatively low boiling point, less than 100° C. for example. The solvent is, for example, a ketone such as methyl-ethyl-ketone, abbreviated here to MEK. The polyamine solution is then added to the epoxy resin. This mixing method, which avoids heating to a high temperature, nevertheless requires subsequent elimination of the solvent.

There is a particular problem in this case, however, with solvent elimination, which problem is linked to the particular polarity of the polyamine-epoxy resin mixture and requires drying by heating to a temperature of 100° C. for several minutes, particular when MEK is used as the solvent. Despite these precautions, about 0.8% by weight of solvent remains in the prepreg. This residual solvent limits the use of such a process to thin laminates, as the solvent bubbles when hot pressing (the pressing temperature is usually above about 120° C.) causes undesirable porosity which can be an impediment to the envisaged use of the prepreg. Such prepregs can only be used for thick composites (over 1 millimeter thick, for example, usually less than 10 centimeters and generally about 5 millimeters to about 5 centimeters thick) if a vacuum contraction cavity coupled with a pressurized autoclave is used, thus severely complicating implementation of such a method. Further, it has been noted that the usable life of such a prepreg is usually of the order of several days and less than one week at ambient temperature and is only a few hours, generally less than 5 hours, at 80° C., which is completely unsatisfactory for the envisaged use.

Clearly, such processes cannot be applied when drying is carried out under mild conditions, i.e., at a moderate temperature, for example less than about 100° C.

In a third method, the polyamine or mixture of polyamines is mechanically ground into very fine particles, normally less than about 50 microns (1 micron=$10^{-6}$ meter) then introduced into the epoxy resin, or the epoxy resin and the polyamine or mixture of polyamines are ground together in an apparatus such as a three-cylinder mill, etc. Such mechanical methods cannot produce homogeneous mixtures simply and safely.

Prior grinding of the polyamine or mixture of polyamines to a very fine powder requires the use of a rigorous protection protocol against micronized aromatic amine dust since such substances are relatively toxic and the user must be protected and must avoid all contact with and inhalation of such dust.

Grinding a polyamine-epoxy resin mixture requires carrying out at least the three following successive steps:

a) mixing a polyamine or polyamine mixture type curing agent with the epoxy resin, normally requiring sufficient heat to cause the dynamic viscosity of the medium to fall in order to be able to form as homogeneous a mixture as possible;

b) passing the mixture obtained in step (a) into a grinding apparatus, for example a three-cylinder mill. During this grinding step, the polyamine particles and the epoxy resin particles segregate on the rollers. This phenomenon is limited when the polyamine-epoxy resin mixture is passed through the grinding system several times;

c) finally, the product obtained in step (b), which is normally not sufficiently homogeneous, is sent to an apparatus which can produce a homogeneous mixture.

This apparatus can, for example, be an anchor reactor. Such a method normally results in large losses of product and involves a large number of manipulations.

Even at moderate temperatures, the time required to produce such a suspension of polyamine in the epoxy resin by mechanical means is sufficiently long to have a substantial and deleterious influence on the latency period which becomes much lower than the desired period for the envisaged use.

These methods, which are known to the skilled person, are thus not applicable to the production of a prepolymer which must satisfy the following conditions:

it must be capable of producing a pot life or usable life if supported on reinforcing fibers, for example glass fibre or the equivalent thereof, which is greater than or equal to 20 days, normally about 30 days to about 4 months, usually about 30 days to about 2 months, for an average storage temperature which is less than or equal to 25° C., normally about 0° C. to about 15° C., and usually about 0° C. to about 5° C.;

it must be capable of producing a residual latency of at least 6 hours after pot storage or supported storage under the conditions described above, preferably at least 8 hours, at a temperature of about 70° C. to about 90° C., usually about 80° C.;

it must be capable of producing a residual latency of at least 8 hours, preferably at least 10 hours, and usually at least 11 hours, at a temperature of about 70° C. to about 90° C., usually about 80° C., after pot storage or supported storage for a period of at least 90 days, normally about 90 days to about 6 months, and usually about 90 days to about 4 months, at a temperature of less than or equal to minus 18° C., normally about −30° C. to about −18° C., and usually about −25° C. to about −18° C.;

it must be capable of being deposited in conventional fashion, manually or mechanically, on a fibrous support such as glass fibre, carbon fiber, KEVLAR® or a metal fibre or wire, on ceramic fibre or on natural or synthetic fibre,; and finally, it must satisfy health and safety regulations.

SUMMARY OF THE INVENTION

The present invention concerns a reactive composition with improved latency containing at least one primary aromatic polyamine containing at least one substituent on the aromatic ring alpha to each of the amine functions, in the form of fine particles, preferably having a size of less than about 100 microns, usually less than 60 microns, in suspension in an epoxy resin, said reactive composition being characterized in that it is obtained by mixing, normally hot mixing, at least one primary aromatic polyamine in liquid form with the epoxy resin, then cooling the solution obtained under conditions which allow said polyamine to recrystallise in the epoxy resin in the form of fine particles.

The thermosetting compositions obtained with the present invention comprise a suspension of fine solid particles of one or more primary aromatic polyamines containing at least one substituent on the aromatic ring alpha to each of the amine functions.

The present invention also concerns the use of these compositions for the production of prepregs with high latency in processes which require intermediate steps at 80° C. lasting several hours.

It also concerns processes for the production of products requiring polymerisation of the composition at a temperature limited to 140° C. which must have good resistance to hydrolysis at 80° C. and above that temperature.

The choice of aromatic polyamines used in the present invention is particularly guided by the fact that aromatic polyamines with low reactivity and low solubility in the epoxy resins used at temperatures below about 40° C. are desirable. The choice is also influenced by the fact that these aromatic polyamines must preferably produce good resistance to hydrolysis by the secondary and tertiary amine chains which they generate by the oxirane cycle reaction. They must also produce good temperature resistance properties.

The composition of the present invention results from an operating procedure which puts the polyamine in suspension under conditions such that the reaction between the two constituents in the formulation is not initiated during the suspension process. When carrying out this process of suspension by recrystallisation, it has been observed that particles form which have the range of sizes indicated above, usually less than about 60 microns, starting from polyamines which, for health and safety reasons, are sold in the form of a powder with a grain size which is normally more than 200 microns or in the form of large flakes which usually have a surface area of several square millimeters and a thickness of about 0.2 to 0.5 millimeters.

In all cases, wetting agents can be used which encourage wetting between the polyamine particles and the epoxy resin or the resin and the fiber support.

The composition of the present invention can comprise a proportion by weight of primary aromatic polyamine of about 20 to about 50 parts per 100 parts of epoxy resin, normally about 25 to about 45 parts per 100 parts of epoxy resin.

The dynamic viscosity of the epoxy resin used is adjusted to a value of about 0.04 to about 50 Pa.s at about 25° C., optionally by addition of a solvent or suitable reactive diluent.

For the composition to have the desired stability or latency, it can, for example, contain at most 30% by weight of these aromatic polyamines dissolved in the epoxy resin provided that the temperature of that composition does not exceed 60° C., preferably 40° C.

The epoxy resin can be selected from the group formed by the commercially available resins cited above, bis-phenol-A or bis-phenol-F diglycidylether resin, bis-phenol formol resin, phenol-novolac resin, cycloaliphatic resins, tri- or tetra-functional resins or mixtures of at least two of these resins.

The present invention also concerns the use of the reactive composition with improved latency to impregnate a structure of braided strands.

The impregnated structure can be introduced into a well bored in the ground, polymerisation of said composition leading to hardening thereof in the well.

The structure may be tubular in form, for example that of the preforms described in International patent documents WO-A-94 25655 and WO-A-94 21887.

These preforms are provided in a folded state so that they can fit within the well diameter and, when provided in the well, are unfolded and allowed to harden to constitute a radially expandable braided tubular structure in the well. By expansion, the structure can constitute a casing, facilitate the cementing of a casing therein or press cement against the wall of the well. In this way a new casing can be cemented or otherwise affixed into the well or an existing damaged casing can be repaired. A casing or repaired casing in a well provides the well a cylindrical, well-defined diameter with a rigid wall, thereby, making it possible to pass various tools and elements required for operating the well.

The present invention will be better understood, and its advantages will become clearer, from the description below of the tests which were carried out.

The tests were carried out using DGEBA epoxy resin manufactured and produced by CIBA, reference number LY 556®. The principal characteristics of the resin are:

dynamic viscosity at 25° C.: 12 Pa.s

Epoxide content: 1.15 equivalents per kilogram density: 1.15 g/cm$^3$.

The composition of the present invention was obtained as described below.

4.64 kilograms of M-DEA with a melting point of 88° C. was heated to a temperature of 90° C. and the liquid was introduced into 16 kilograms of liquid DGEBA contained in a reactor comprising temperature regulation means which maintained the temperature of the mixture being formed between about 40° C. and about 60° C. during the entire period of adding the M-DEA to the DGEBA. When addition was complete, the mixture was cooled to ambient temperature. Very fine particles of M-DEA formed which could be seen in suspension in the DGBEA. Recovery of this suspended product by filtering showed that the recrystallisation yield was 73% by weight and the dissolved portion of the amine did not exceed 27% by weight, The grain size of the polyamine formed during recrystallisation, observed under a microscope, showed that the majority of grains were about 30 to 40 microns and that almost all of these grains were of a size which was in the range 10 to 50 microns.

A composition comprising M-DMA produced in the same way by adding M-DMA with a melting point of 117° C. heated to 120° C. to DGEBA in the same proportions and under the same conditions as those described for M-DEA (see above) produced the same degree of recrystallisation and the same particle size.

In both cases, it was established that the DGBEA-polyamine paste mixtures produced using the procedure of the present invention had a pot life and/or stability after impregnation into glass material of 5 days or more at an average temperature of 22° C. It was also established that the stability or residual latency after storage for 30 days at 4° C. or after storage for 90 days at –18° C., the mixtures being neat or impregnated into a support, could be kept for a minimum of 12 hours during exposure to use at a temperature of about 80° C. No settling of the solid polyaninc particles was observed over time.

Manual impregnation into glass fibers at an average temperature of 40° C. was possible and produced good quality coated supports which were at least comparable with conventional products.

Mechanical impregnation using a machine provided with a scraper or a dosing roller was also possible at a mixing temperature of about 40° C.

Impregnation by inversion followed by draining using conventional techniques was also possible at 40° C.

It was thus established that using the composition of the invention posed no specific-problems over known techniques, except for the need to keep to a maximum temperature of about 40° C.

It is thus clear that performs, for example of glass, carbon or polyamide material, or even of metal, for example the products described in WO-A-94 25655 and WO-A-94 21887, can be impregnated with the compositions of the present invention, and then stored for at least 30 days at a temperature of 5° C. or less, and for 90 days at a temperature of –18° C. or less, in advance of positioning in a well where final polymerisation is carried out by deliberate addition of heat.

The physical properties of the materials obtained from the DGBEA and the selected amine paste mixtures were tested for resins cured from these mixtures after a curing period of 8 hours at 140° C. or after i curing period of 2 hours at 200° C. The glass transition of the paste mixture was 157° C. in the case of curing at 140° C., and 170° C. for a cure at 200° C. This glass transition corresponded to known values for conventional mixtures of the two constituents cured under the same conditions. This confirms that the products obtained with the present invention are products which are comparable to those obtained conventionally, in particular by prior hot dissolution of the polyamine in DGBEA, where the mixture has very low latency, The composition obtained as described above comprising M-DEA as the polyamine was used to produce a 3.2 millimeter thick laminate (20 layers) which had a resin content of 37% by weight. The mechanical and physical properties of the laminate obtained were identical to those of laminates composed of layers which had been preimpregnated using the "solvent" method or those of laminates obtained by first mixing the polyamine with the epoxy resin and dissolving by melting.

The appearance of the composite was checked after post-curing. No heterogeneity was observed under a microscope, which would have been due to agglomeration or to polyamine which had not or had not properly melted in the resin.

The appearance of the composite was identical to that of a conventionally produced laminate.

In order better to demonstrate the advantage of the composition production process of the present invention, various samples of compositions were produced using conventional prior art methods for preparing these compositions, using the same proportions of the same constituents, namely DGEBA and M-DEA. The comparison test selected was the gel time at 80° C. The gel time is the time required, at a given temperature and for a given composition, to achieve a degree of polymerisation $X_g$. This degree of polymerisation $X_g$ of the reaction at the gel point is an important factor as it is linked to a major rheological change due to the irreversible transformation of a viscous liquid to a viscoelastic gel. The gel time was measured using an apparatus sold by PRODEMAT under the trade name TROMBOMAT®, which could determine the gel point and evaluate the reactivity of the curing agent by following the reaction kinetics.

Composition N° 1 was obtained by the mechanical method using a three-cylinder mill as described above with a maximum temperature of 40° C. Composition N° 2 was obtained by melting a mixture of polyamine powder and DGBEA at 100° C. for 30 minutes then gradually cooling over one hour to a temperature of 22° C. Composition N° 3 was obtained by mixing the constituents in methyl-ethyl-ketone then evaporating off the solvent as described above. Composition n° 4 was that obtained using the present invention as described above. Table 1 below gives the gel times at 80° C. It can be seen that a much longer gel time was obtained for the composition obtained in accordance with the invention. It can also be seen that only the gel time of composition N° 1 was relatively reasonable, while that of the other compositions 2 and 3 was completely unsatisfactory for the envisaged use.

TABLE 1

Gel time in hours and minutes

| Composition N° 1 | Composition N° 2 | Composition N° 3 | Composition N° 4 |
|---|---|---|---|
| 11 h. 45 min | 6 h. 00 | 10 h. 00 | 12 h. 35 min |

We claim:

1. A method comprising:

introducing into a well an impregnated tubular structure having braided strands impregnated with a reactive composition with extended latency, the reactive composition containing at least one primary aromatic polyamine containing at least one saturated hydrocarbon substituent on the aromatic ring alpha to each of the amine functions, said polyamine being in the form of particles having a size of less than 100 microns in suspension in an epoxy resin said composition being obtained by mixing said at least one primary aromatic polyamine in liquid form with the epoxy resin, then cooling the solution obtained under conditions which allow said polyamine to recrystallise in the epoxy resin in said particle form, and polymerizing the composition so that it hardens in the well.

2. A method according to claim 1, in which the primary aromatic polyamine is selected from the group consisting of primary aromatic diamines containing two substituents on the aromatic ring alpha to each of the amine functions.

3. A method according to claim 1, in which the primary aromatic polyamine contains, on the aromatic ring alpha to each of the amine functions, at least one substituent selected from the group consisting of alkyl residues containing 1 to 12 carbon atoms.

4. A method according to claim 1, in which the primary aromatic polyamine contains, on the aromatic ring alpha to each of the amine functions, at least one substituent selected from the group consisting of alkyl residues containing 1 to 4 carbon atoms.

5. A method according to claim 1, in which the primary aromatic polyamine is selected from the group consisting of 4,4'-methylene-bis-(2,6-diethylaniline) and 4,4'-methylene-bis-(2,6-dimethylaniline).

6. A method according to claim 1, in which the proportion of primary aromatic polyamine is about 20 to about 50 parts by weight per 100 parts of epoxy resin.

7. A method according to claim 1, in which the dynamic viscosity of the epoxy resin used is adjusted to a value of about 0.04 to about 50 Pa.s at about 25 ° C., optionally by addition of a solvent or reactive diluents.

8. A method according to claim 1, in which the epoxy resin is selected from the group consisting of bis-phenol-A, bis-phenol-F diglycidylether ether resin, bis-phenol formaldehyde resin, phenol-novolac resin, cycloaliphatic resins, tri- or tetra-functional resins and mixtures of at least two of said resins.

9. The method of claim 1, wherein the reactive composition has a gel time at 80° C. of longer than 12 hours.

10. The method of claim 1, wherein the impregnated structure is introduced into the well in a folded state and is unfolded in the well before being hardened.

11. The method of claim 1, wherein the impregnated structure is radially expanded against the well after being introduced.

12. The method of claim 1, wherein the impregnated structure forms a casing in the well.

13. The method of claim 1, wherein the impregnated structure is used to press a casing against the well.

14. The method of claim 1, wherein the impregnated structure is used to press cement against the well and/or casing therein.

15. The method of claim 14, wherein a casing is repaired by pressing cement against it.

* * * * *